United States Patent [19]
Lalikos et al.

[11] Patent Number: 4,729,583
[45] Date of Patent: Mar. 8, 1988

[54] REUSABLE END FITTING FOR CONVOLUTED HOSE

[75] Inventors: James M. Lalikos, Springfield, Mass.; Norman H. Desilets, Enfield, Conn.

[73] Assignee: Titeflex Corporation, Springfield, Mass.

[21] Appl. No.: 873,841

[22] Filed: Jun. 9, 1986

Related U.S. Application Data

[60] Continuation of Ser. No. 763,757, Aug. 7, 1985, abandoned, which is a continuation-in-part of Ser. No. 743,286, Jun. 11, 1985, abandoned, Division of Ser. No. 643,067, Aug. 22, 1984, abandoned.

[51] Int. Cl.⁴ ............................................. F16L 33/24
[52] U.S. Cl. .................................. 285/149; 285/251; 285/256; 285/903; 285/259; 285/247
[58] Field of Search .............. 285/149, 247, 251, 246, 285/259, DIG. 4, 255, 256; 138/121, 173

[56] References Cited

U.S. PATENT DOCUMENTS

| | | | |
|---|---|---|---|
| 48,709 | 7/1865 | Emery | 285/251 |
| 1,251,086 | 12/1917 | Morgan | 285/251 |
| 1,588,605 | 6/1926 | Oden | 285/251 |
| 1,861,403 | 5/1932 | Wallace | 285/251 |
| 2,059,040 | 10/1936 | Scholtes | 285/251 |
| 2,848,254 | 8/1958 | Millar | 285/149 |
| 2,858,147 | 10/1958 | Guarnaschtelli | 285/251 |
| 2,991,093 | 7/1961 | Guarnaschelli | 285/149 X |
| 3,078,109 | 2/1963 | Jackson et al. | 285/251 |
| 3,167,330 | 1/1965 | Draudt | 285/903 |
| 3,207,535 | 9/1965 | Wilson | 285/251 |
| 3,237,974 | 3/1966 | Press | 285/259 X |
| 3,381,981 | 5/1968 | Wilson | 285/259 |
| 4,063,757 | 12/1977 | Führmann | 285/903 |
| 4,196,031 | 4/1980 | Lalikos et al. | 138/121 X |
| 4,369,992 | 1/1983 | Fournier et al. | 285/256 |
| 4,376,548 | 3/1983 | Armstrong | 285/256 |
| 4,400,022 | 8/1983 | Wright | 285/DIG. 4 |
| 4,437,689 | 3/1984 | Goebel et al. | 285/246 |

FOREIGN PATENT DOCUMENTS

| | | | |
|---|---|---|---|
| 565460 | 7/1960 | Belgium | 285/149 |
| 685353 | 4/1964 | Canada | 285/256 |
| 690604 | 6/1964 | Canada | 285/251 |
| 14051 | 8/1980 | European Pat. Off. | 285/247 |
| 1224248 | 6/1960 | France | 285/251 |
| 1400442 | 4/1965 | France | 285/256 |
| 515628 | 3/1957 | Italy | 285/251 |
| 804583 | 11/1958 | United Kingdom | 285/149 |
| 1188512 | 4/1970 | United Kingdom | 285/247 |
| 1245265 | 9/1971 | United Kingdom | 285/256 |
| 47109 | 9/1971 | United Kingdom | 285/256 |

Primary Examiner—Alexander Grosz
Assistant Examiner—Eric K. Nicholson
Attorney, Agent, or Firm—Louis Bernat

[57] ABSTRACT

Twin seals are provided between an end fitting and a convoluted hose connected thereto. The end fitting has two parts, one of which terminates in an elongated member having large and coarse threads on the outside thereof. As the elongated member is turned into the end of the hose, convolutions at the end of the hose are either scrunched and squeezed together or stretched over a ramp section. One of the seals is along the surface of the large threads and the other is a result of the end thrust either the scrunching and squeezing or the stretching of the end convolutions. A pilot end of braid on the hose pulls it to increase the end thrust. In some embodiments, a third seal is made between the outside surface of the hose and a gland surrounding the hose. The pitch of the large and coarse threads may be longer than the pitch of the convolutions so that an inner core of the hose advances faster than the outer braid, as the elongated member is turned into the end of the core thereby increasing either the scrunching and squeezing or the stretching.

13 Claims, 6 Drawing Figures

REUSABLE END FITTING FOR CONVOLUTED HOSE

This is a continuation of U.S. patent application Ser. No. 763,757, filed Aug. 7, 1985, now abandoned, which in turn is a continuation-in-part of U.S. patent application Ser. No. 743,286, filed June 11, 1985, now abandoned, which in turn is a division of U.S. patent application Ser. No. 643,067, filed Aug. 22, 1984, now abandoned, and entitled "REUSABLE END FITTING FOR CONVOLUTED HOSE".

This invention relates to end fittings for convoluted hoses and more particularly, to reusable end fittings for such hoses.

Reference is now made to U.S. Pat. No. 4,437,689, which shows a reusable end fitting that is especially well suited for use in certain types of smooth bore hoses which must be cut to length and connected to end fittings in the field. This patent discloses fittings which make twin seals between the hose and the end fitting, one seal being made against the smooth inside bore of the hose and the other seal being made against the end of the hose.

Another kind of hose is one with a convoluted liner, similar to that disclosed in U.S. Pat. No. 4,196,031. There is also a need for an end fitting which may be reusably fitted onto such a convoluted hose. However, the problems are quite different when making end fitting connections to smooth bore and to convoluted hoses. The convolutions do not present a smooth interior surface for making a simple sliding seal and the ends do not easily adapt themselves to making simple abutment seals. Therefore, it is not possible to use the end fitting of U.S. Pat. No. 4,437,689 on convoluted hoses.

An object of the invention is to provide new and improved reusable end fittings for convoluted hoses. Here, an object is to provide convoluted hose fittings which can make at least twin seals.

Another object of the invention is to provide fail-safe end fittings which retain their integrity for longer periods of time under conditions of a hostile environment.

In keeping with an aspect of the invention, these and other objects are accomplished by providing a two part end fitting, one part having an elongated member with a relatively large and coarse outside spiral thread. A cross-section of the threads on the fitting complements the interior cross-section of the convoluted ridges of the hose. Thus, the threads of the fitting may be turned into the convolutions of the hose and a first sealing fit is made along the undulating surface where the large and coarse thread comes into contact with the hose convolutions. Depending upon how elastic the hose may be, the relative diameters or pitch of the hose and fitting are designed to stretch the inner core somewhat as the fitting is turned into the hose. As the fitting is so turned, the end of the convoluted tube bottoms into a relief area and then, as the turning continues, the end convolutions are either scrunched and squeezed together into the confined space of the relief area or stretched over a ramp area. This squeezing or stretching causes a compression or tension at the end of the hose which forces it to form the second of the twin seals. The closing of the two end fitting parts, one on the other, also pulls an outer braid covering to increase the end compression. In some embodiments, a gland is added to make a third seal at the outside diameter of the convoluted hose.

Several embodiments of the invention are shown in the attached drawings, wherein.

Figure 1:
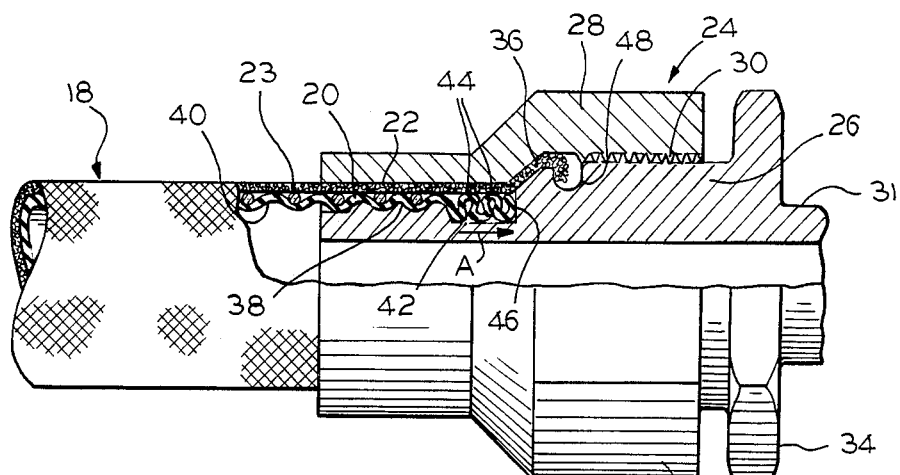
FIG. 1 is a side elevation, partly in cross-section, which shows a first embodiment of the inventive end fitting applied to a convoluted hose having an exemplary wire braid.

One of many convoluted hoses which may be used with this inventive end fitting is shown in U.S. Pat. No. 4,196,031. Either it, or another suitable hose 18, is shown in FIG. 1, as having an internal elastomeric hose liner 20, which is convoluted in a sprial form, and which appears in cross-section as uniformly recurring hill and valleys. Over the outside of the convoluted hose, there is a braid covering 22 which may be any of the many known materials which give a mechanical protection against scuffing or abrading. In some hoses, a metallic element such as a reinforcing wire 23 or a metal braid 36 is grounded to provide a shielding against sparks; however, by far, most hoses do not have the reinforcing wire. Many do not have metal braid.

The end fitting 24 has coaxial inside and outside parts 26, 28 which are joined to each other by complementary threaded sections 30. The right-hand end 31 of inside part 26 may have any suitable connector (not shown), such as a screw thread. The left-hand end of inside part 26 is an elongated member having a large and coarse threaded end 38, on its outside surface. Wrench faces 32, 34 are provided on the two parts 26, 28 so that they may be turned relative to each other to bring together and tighten the parts 26, 28. As they are turned, the parts advance on threads 30 and a pilot end 36 of the hose braid is captured by friction in a first relief area 48 between inside and outside parts 26, 28 and is pulled tightly to compress the end of the hose against an abutment wall 46. As shown in FIG. 1, the pilot end is the braid 36 in the area of convolutions, at the end of the hose, where convolutions are scrunched and squeezed together.

The inside part 26 has an elongated end with a large and coarse threaded surface 38 having an exterior contour which either exactly matches the internal contours 40 of the hose, or has a pitch slightly greater than that of the hose. The diameter of the end fitting is a little larger than the diameter of the hose so that it is expanded somewhat when the end fitting part 26 is turned into place. Therefore, the inside part 26 may be turned into the convoluted liner 20, thus advancing the surface 38 of part 26 into the convoluted end of the hose. The pitch of surface 38 may be slightly longer than the pitch of the inner core convolutions 40, thereby forcing the inner core to move faster than the braid. This assures that the inner core reaches the shoulder 46 before the braid, and its compression helps to lift the braid onto the locking ramp.

A first relief area 42 is provided at the inner end of the large and coarse threaded section 38 so that a number of convoluted turns 44 on the end of the hose may be scrunched, squeezed, and compressed into a tightly confined mass in the first relief area 42. The memory of the plastic, plus the physical compression, causes the hose liner to exert a sealing force in direction A, thereby pressing the end of the hose against an abutment wall 46 at the end of the first relief area 42. The pulling of braid 36 as the fitting is closed enhances the sealing force in direction A. Hence, there are twin seals, one seal being between convoluted surfaces 40, 38, as well as along the contours of relief area 42, and the other seal being the end of the hose pressed against abutment wall 46.

For assembly, the braid 36 may be separated, if necessary, for a short distance away from the end of the convoluted liner to provide a pilot end section of braid at the end of the hose. Part 28 is slipped over the outside end of the hose with the threaded end 30 facing the end of the hose. Then, the elongated left-hand end of inner insert part 26 is screwed into the convoluted end of the hose liner 38 while the hose is held immobile, either by hand or by a suitable clamp. The dimensions are such that the inside diameter of the convoluted hose is expanded in a range of about 1/32 to ¼ of an inch, thereby stretching it enough to insure a good grip and a good seal against threads 38. When the internal convoluted liner 20 is "Teflon", a 10-20% expansion of its internal diameter is desired. The part 26 is turned until the end of the hose bottoms against abutment wall 46 while the braid begins to creep up the ramp. A continual turning of the part 26 causes the inner core 20 of the hose to become sufficiently compressed to prevent further turning of the inside part 26. By then, the braid is well up the ramp.

After the parts are properly positioned, the outer end fitting part 28 is brought up to the inner part 26 and turned onto the threads 30. The pilot end section of braid 36 becomes captured in a second relief area 48 between the parts 26, 28 and the entire hose tends to be dragged along by friction and by the expanded outside diameter caused by initial compression of the inner core, as the parts advance toward each other while they turn on threads 30. The pitch of the threads 38, 40 is much greater than the pitch of the threads 30. Therefore, to the extent that part 26 turns, if it does, the end of the fitting part 26 advances into the end of the hose faster than the metal parts 26, 28 advance toward each other; thus, further propelling part of the hose 20 into the relief area 42. The braid pulls, scrunching and squeezing the convoluted turns into tighter contact, further creating compression in the relief area 42. This scrunching and squeezing further expands the outside diameter of the hose, thus enhancing the sealing between the hose and the insert part 26. Or conversely stated, the outside fitting part 28 radially squeezes both the hose and the braid.

The recess 48 receives any excess braid to prevent it from jamming the two parts.

Figure 2:
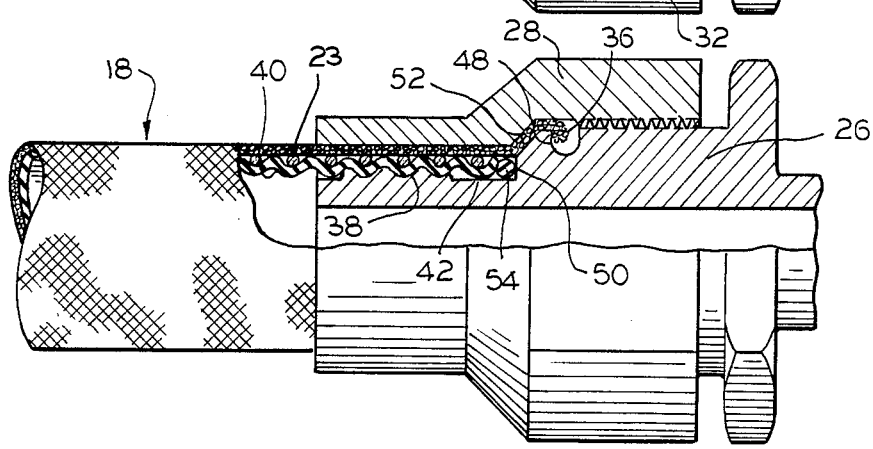
FIG. 2 is a similar view which shows a second embodiment having an auxiliary O-ring seal at the compressed end.

In the embodiment of FIG. 2, the abutment wall 50 is somewhat lower at the point of contact with the hose end so that it will be easier to pull the pilot end 52 of the braid onto the end fitting 26. To compensate for the lowering of the wall 50, an O-ring 54 may be positioned between the end of the convoluted hose liner and the abutment wall. Therefore, the compression of the hose against the O-ring further enhances this aspect of the twin seal.

Figure 3:
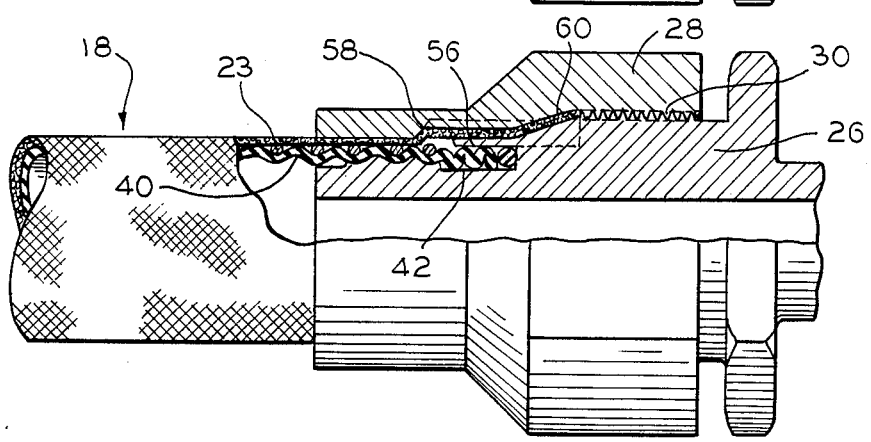
FIG. 3 is a similar view which shows a third embodiment having a gland for providing a third seal by enhancing radial compression along the outside diameter of the hose.

In the embodiment of FIG. 3, a wedging gland 56, having a somewhat triangular cross-section, may be provided to give a radial compression to the end turns of the convoluted hose which are scrunched and squeezed into the first relief area 42. The gland 56 may be either a separate piece or an integral part of the inner piece 26. If the part 26 is a single piece, it and the gland 56 are preferably a series of contours made on a screw machine. In some embodiments, the gland 56 and part 26 may be separate parts which are welded, brazed, or screwed together.

The assembly of the embodiment of FIG. 3 is similar to that of the FIG. 1 embodiment.

The outside end 58 of the gland slips into the space between the pilot end 60 of the braid and the convoluted end of the inner liner 20 when the insert 26 is turned into the end of the hose 18. This gives three sealing surfaces instead of the two in FIGS. 1 and 2 (the third surface being between the gland and the outside diameter of the hose 20). As the pilot end of the hose is pulled, the wedge shape of the gland progressively increases the radial compression on the outside diameter of the convoluted turns, and especially on the turns which are scrunched and squeezed into the relief area 42. Or, if the gland is a separate part, it is inserted between the braid and convoluted liner before the threaded areas 30 engage each other. In any event, the tighter the convoluted hose is pulled into place, the more enhanced the radial compression becomes. This enhanced radial compression further aids the seals in the other two areas, i.e., (a) at the end compression against wall abutment, and (b) between the large and coarse threads 38 and convolutions 20 and at surface of relief area 42.

Figure 4:
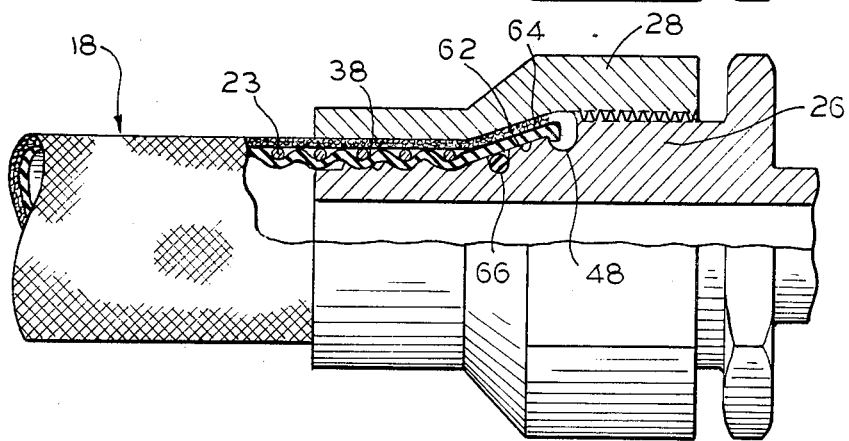
FIG. 4 is a similar view which shows a fourth embodiment wherein the convolutions are flattened and stretched at the end in order to enhance the seal.

In yet another embodiment (FIG. 4), the relief area 42 is replaced by a generally smooth, somewhat conical or funnel shaped ramp area 62 over which the convoluted liner 64 is stretched. This way, the plastic memory of the valleys in the convoluted material tends to act somewhat as spaced parallel rubber bands circumferentially positioned around smooth ramp 62, which help form one of the twin seals in the ramp area. This time, both the braid and the convoluted hose form the pilot end of the hose. In the embodiment of FIG. 4, an O-ring 66 may or may not be provided in the ramp area, depending upon the needs of the particular material.

Figure 5:
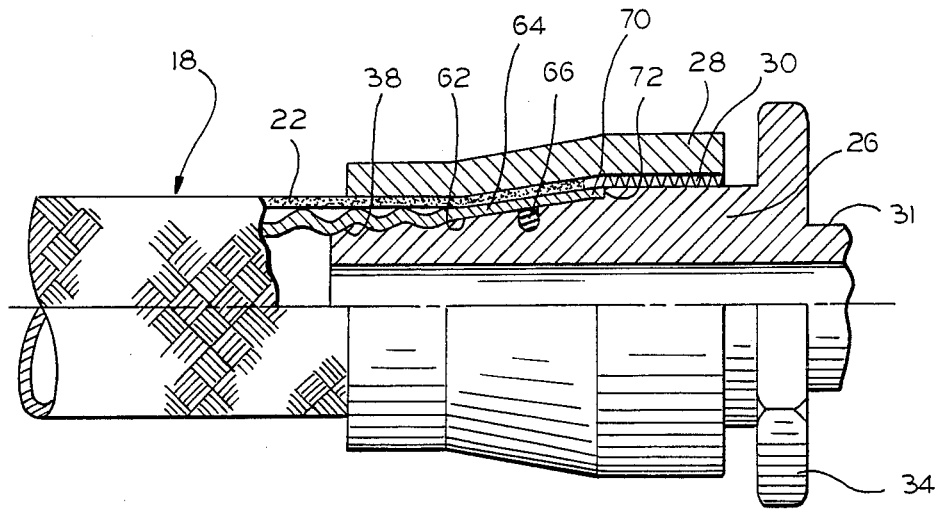
FIG. 5 is a similar view which shows a variation of the fourth embodiment that increases the length of a ramp section and deletes a relief area at the end of the hose.

The assembly of the embodiment of FIG. 4 is similar to that described above for the embodiments of FIGS. 1, 2. However, the pitch of the large and coarse threads 38 is variable (progressively increasing in pitch and diameter) so that the end of the hose tends to flatten the convolutions as the end 26 is screwed into the end of the hose 20. The braid and the flattened inner core of hose 20 tend to move and to flatten as a unit while they move up the ramp with the inner core moving faster because of the longer pitch on end part 26. Once the inner core reaches the top of the ramp, part 28 may be turned into place. The principles of FIG. 4 are followed in FIG. 5 except that the relief area 48 does not appear in FIG. 4. Instead, the flattened end 70 of the stretched liner 64 is abutted against a circumferential step wall 72 on the inner end fitting part 26. The outer braid is cut off at a point near the step wall 72, but far enough back on the hose side of the wall to help compress the hose 70 when the fitting is closed. Thus, when the outer end fitting part 28 is turned on threads 30, the liner is compressed to form a better seal on both the smooth ramp position 62 and against the circumferential wall 72. The auxiliary O-ring seal 66 is optional and provides a third sealing point.

Figure 6:
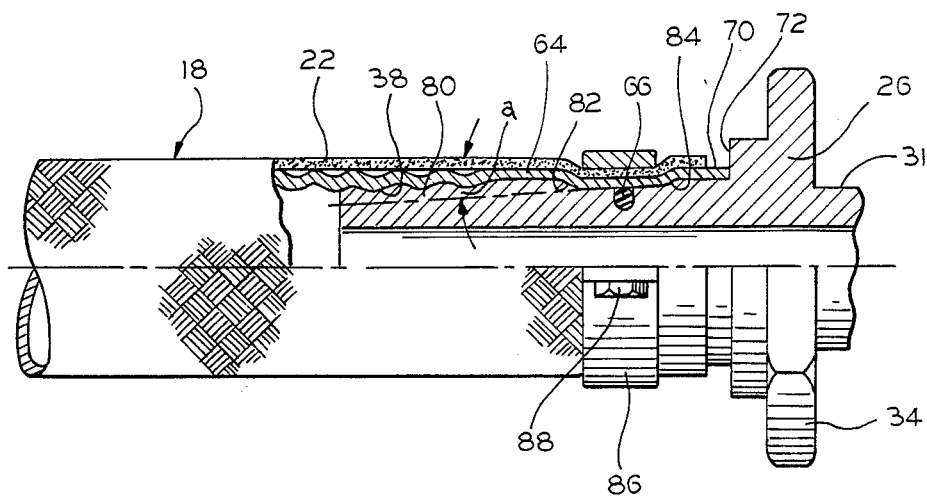
FIG. 6 is a similar view which shows another variation of the fourth embodiment in which the ramp section has a depressed neck section for receiving an external hose clamp.

In the version of FIG. 6, the principle of the ramp is also used, as is indicated by the inclined dashed line 80 and the angle a formed between it and the outside surface of the hose. However, the ramp itself contains a depressed neck area formed between two shoulders 82, 84 to receive a circumferential hose clamp 86. As the inner end fitting part 26 is turned into the convolutions at the end of the hose, the convolutions are stretched and flattened by the ramp effect. Then, the clamp 86 is fixed in position and tightly secured over said neck area by one or more bolts 88. This compresses the liner and causes it to make a better seal. Also, the compression causes the liner end 70 to be pressed against the step wall 72, thereby forming the end seal described above.

The selection of one of the embodiments over the other embodiments relates primarily to the physical properties of the convoluted inner liner. For those hoses which have little elasticity, FIG. 1 is preferred since the seal depends in large part upon the integrity of screwing the end part 26 into place within the hose. For those hoses with substantial elasticity, FIG. 4 is preferred since the convolutions are easily flattened. Between these two extremes, any of a number of different considerations may make one of the other embodiments more preferred.

Those who are skilled in the art will readily perceive how to modify the system. Therefore, the appended claims to be construed to cover all equivalent structures which fall within the true scope and spirit of the invention.

What is claimed:

1. A reusable end fitting for a convoluted hose, said end fitting comprising coaxial inside and outside parts each of which has an inner and an outer end, said parts being joined to each other at said coaxial inner ends when said parts are attached to a hose, said inside part having an elongated section with a large and coarse screw thread at its outer end to turn into the convolutions of said hose, the contours of the large and coarse screw thread and hose convolutions approximately complementing each other, the pitch and diameter of said coarse screw threads progressively increase to progressively flatten said convolutions onto a generally smooth substantially funnel shaped ramp area near the inner end of said elongated section, the diameter of a small end of said funnel shaped ramp area beginning with the diameter of said elongated section having said coarse screw threads and progressively increasing thereafter, whereby a continual turning of said inner member into said hose stretches at least some of the convolutions at the end of the hose and gradually smooths and stretches the hose over said ramp area, valleys of said convolutions on said hose being stretched to seal around the ramp area, said outside part having an internal area with a contour which is complementary to said substantially funnel shaped ramp area, and means responsive to a joining of said inside and outside parts for compressing the end of said hose in a captured position between said parts in said funnel shaped ramp area and the contour which is complementary thereto.

2. The fitting of claim 1 wherein said convoluted hose has an outer braid and said compressed end includes at least part of said braid which corresponds to said stretched convolutions in said funnel shaped ramp area.

3. The end fitting of claim 2 and an O-ring in said ramp area for making contact with the inside of said stretch convolutions.

4. The fitting of claim 1 wherein the outside diameter of said large and coarse screw thread is slightly larger than the inside diameter of said convolutions of said hose whereby said hose is stretched over said large and coarse screw threads when said elongated end is turned into said convoluted hose.

5. The fitting of claim 4 wherein said hose is stretched approximately 10–20%.

6. The fitting of claim 1 wherein the pitch of said large and coarse screw thread is slightly larger than the pitch of said convolutions of said hose.

7. The fitting of claim 1 wherein said inside and outside parts are joined to each other by screw threads, and means for gripping the end of said hose and pulling it into said capture position responsive to said turning of said inside and outside parts on said screw threads.

8. The fitting of claim 1 wherein said inside and outside parts are joined to each other by screw threads, a circumferential step wall being formed on one of said parts, and means for compressing an end of said hose against said step wall on said one of said parts responsive to the turning of said inside and outside parts on said screw threads.

9. A method of making a two part fitting connection to a convoluted hose, said method comprising the steps of:
  (a) screwing one of said two parts which comprises an elongated fitting having a large and coarse thread extending in a progressively increasing pitch and diameter to form a gradually smoothing walled ramp, into the end of a convoluted hose, the other of said parts having an internal area which is complementary to said smooth walled ramp within a space therebetween;
  (b) continuing screwing said fitting into said hose to gradually stretch the convolutions at the end of said hose into a pressure contact gradually flattening and smoothing said hose over said smooth walled ramp on said elongated fitting;
  (c) capturing an end of said hose between said two parts of said fitting and in said space between said ramp and the area complementary thereto; and
  (d) placing said stretched convolutions at the end of said hose into a tighter pressure contact over said ramp responsive to a closing of said two parts relative to each other.

10. The method of claim 9 wherein the outside diameter of said large and coarse thread is larger than the inside diameter of said hose whereby said hose is stretched over said large and coarse threads.

11. The method of claim 10 and the added step of radially compressing said stretched convolutions.

12. The method of claim 9 wherein said parts of said fitting are joined to each other by screw threads, and step (d) comprises the added step of pulling and dragging the end of said stretched hose into said pressure contact.

13. The method of claim 12 and a circumferential step wall on one of said parts, said pulling and dragging pressing an end of said hose into pressure contact with said step wall.

* * * * *

UNITED STATES PATENT AND TRADEMARK OFFICE
CERTIFICATE OF CORRECTION

PATENT NO. : 4,729,583

DATED : March 8, 1988

INVENTOR(S) : James M. Lalikos et al.

It is certified that error appears in the above-identified patent and that said Letters Patent is hereby corrected as shown below: Title page:

In the Abstract, line 10, after "thrust" insert --caused by--.

Col. 4, line 62, start a new paragraph with --The principles of FIG. 4--.

Col. 6, line 7, (Claim 3), change "stretch" to --stretched--.

Signed and Sealed this

Tenth Day of January, 1989

*Attest:*

DONALD J. QUIGG

*Attesting Officer*  *Commissioner of Patents and Trademarks*